(12) United States Patent
Mordeglia (10) Patent No.: US 11,742,660 B2
(45) Date of Patent: Aug. 29, 2023

(54) PLANT FOR MELTING AND/OR HEATING METAL MATERIAL AND METHOD TO POWER IT

(71) Applicant: DANIELI AUTOMATION S.P.A., Buttrio (IT)

(72) Inventor: Antonello Mordeglia, Bangkok (TH)

(73) Assignee: DANIELI AUTOMATION S.P.A., Buttrio (IT)

( * ) Notice: Subject to any disclaimer, the term of this patent is extended or adjusted under 35 U.S.C. 154(b) by 0 days.

(21) Appl. No.: 17/782,992

(22) PCT Filed: Nov. 26, 2020

(86) PCT No.: PCT/IT2020/050295
§ 371 (c)(1),
(2) Date: Jun. 6, 2022

(87) PCT Pub. No.: WO2021/111484
PCT Pub. Date: Jun. 10, 2021

(65) Prior Publication Data
US 2023/0018468 A1    Jan. 19, 2023

(30) Foreign Application Priority Data
Dec. 6, 2019    (IT) .................... 102019000023310

(51) Int. Cl.
| *H02J 3/00* | (2006.01) |
| *H02J 3/38* | (2006.01) |
| *C21B 13/12* | (2006.01) |
| *H02J 3/46* | (2006.01) |
| *H05B 6/06* | (2006.01) |
| *H05B 7/148* | (2006.01) |

(52) U.S. Cl.
CPC .............. *H02J 3/007* (2020.01); *C21B 13/12* (2013.01); *H02J 3/381* (2013.01); *H02J 3/46* (2013.01); *H05B 6/067* (2013.01); *H05B 7/148* (2013.01)

(58) Field of Classification Search
CPC ...... H02J 3/00; H02J 3/002; H02J 3/38; H02J 3/381; H02J 3/46; C21B 13/12; H05B 6/067; H05B 7/148; H05B 6/06
See application file for complete search history.

(56) References Cited

U.S. PATENT DOCUMENTS

2010/0181837 A1    7/2010  Seeker et al.
2019/0018437 A1    1/2019  Le

FOREIGN PATENT DOCUMENTS

| EP | 3124903 B1 | 2/2019 |
| IT | VI 20 090 180 A1 | 1/2011 |
| WO | WO-2019/207609 A1 | 10/2019 |

OTHER PUBLICATIONS

International Search Report and Written Opinion for PCT/IT2020/050295, dated Feb. 19, 2021.

*Primary Examiner* — Robert L Deberadinis
(74) *Attorney, Agent, or Firm* — Marshall, Gerstein & Borun LLP (57) ABSTRACT

A plant for melting and/or heating metal material includes a furnace, electrical energy feed means and an electric power apparatus connected between the feed means and the furnace; and a corresponding method to power the melting and/or heating plant.

15 Claims, 5 Drawing Sheets

PLANT FOR MELTING AND/OR HEATING METAL MATERIAL AND METHOD TO POWER IT

FIELD OF THE INVENTION

The present invention concerns a plant for melting and/or heating metal material, comprising an electric furnace and an electric power apparatus suitable to supply high-power ohmic-inductive loads, in the order of, but also over, 100 MW.

Embodiments described here also concern a method to electrically power the melting and/or heating plant.

In particular, the present invention can be applied in the steel industry and in the steel production sector, or also in the sector of working other metals, or glass materials, in which electric furnaces are used for melting metal materials, for example electric arc furnaces, ladles, submerged arc furnaces, melting or refining furnaces, induction melting furnaces or induction heating furnaces.

BACKGROUND OF THE INVENTION

Plants for heating and/or melting metal materials are known, which comprise electric furnaces in which the material to be melted is introduced, and one or more power apparatuses which take energy from an electricity grid and supply it to the electric furnace.

The electric furnaces of the type in question can be chosen in a group comprising: electric arc furnaces, submerged arc furnaces, ladle furnaces, and in general melting, refining, heating or induction furnaces.

These electric furnaces generally behave as a non-homogeneous ohmic-inductive load, since the power required and absorbed by it can vary as a function of the process step or the type of metal material used.

From patent EP-B-3124903, in the name of the Applicant, an electric power apparatus for an electric arc furnace is known, which comprises a device for positioning the electrodes, and a regulation unit comprising a plurality of converters which can be selectively commanded in order to regulate the supply voltage and current of the electrodes.

The power apparatus described in EP'903 therefore behaves like an adjustable generator of current, and is able to generate the electric power required to power an electric arc furnace as a function of the step of the process which is being carried out (perforating, melting, refining). This distinguishes the solution of EP'903 from traditional solutions in which the transformer acts as a voltage generator and the current is not controllable, but is limited only by the parameters of the equivalent circuit, which vary as a function of the step of the process.

The power apparatus described in EP'903 also allows to regulate the current and voltage of the arc separately, so as to considerably limit the variations in current in the first step of the process, that is, in the perforation step, and make it practically stable in the subsequent steps of melting and refining.

Both the power apparatus described in EP'903, and also traditional power apparatuses, are usually powered by a three-phase supply electric current supplied by the public electricity grid.

Patent application WO-A-2019/207609 describes a melting apparatus and method in an electric arc furnace by means of a three-phase supply electric current supplied by a traditional electricity grid. The apparatus comprising a transformer, a plurality of rectifiers connected to the transformer and a plurality of converters connected on one side to the rectifiers and on the other to the electrodes of the electric arc furnace.

Document IT102009901751919 describes a device for powering a domestic user device by coupling a first electric supply source with one or more auxiliary electric power sources.

Document US-A-20190018437 describes an electrical energy supply system comprising a primary transformer and a secondary transformer and a controller configured to control an adjustment signal generator to apply an adjustment power signal to the transformer secondary, wherein the supply system comprises an auxiliary power supply device connected to the transformer primary.

It is known that melting and/or heating plants, for example used for the production of steel in the steel sector, require a high power supply for the furnace, which is a few tens of megawatts (MW), in particular comprised between 30 MW and 200 MW, as a function of the size of the plant and/or the furnace.

In order to have a sufficient energy supply it is therefore necessary for the melting and/or heating plants to be continuously connected to the electricity grid.

In addition, the absorption of three-phase alternating electric current is a function of production, therefore the greater the casting produced by the furnace, the greater the amount of electrical energy that it is necessary to purchase.

One disadvantage of traditional solutions is that they need to be constantly connected to the public electricity grid.

Another disadvantage is that the uptake of electrical energy can be expensive, in particular in certain geographic areas, or it can become expensive following significant socio-economic events, increasing even considerably the estimated supply costs.

Various steel plants are therefore forced, for example, to limit production to night times, when the electrical energy supplied by the electricity grid has a lower cost.

In addition, in the event of possible blackouts of the electricity grid, it is necessary to stop the plant and production, with consequent problems of loss of productivity and therefore of delay in the delivery of production batches.

There is therefore the need to perfect an apparatus for heating and/or melting metal materials that can overcome at least one of the disadvantages of the state of the art.

In particular, one purpose of the present invention is to provide a melting and/or heating plant for metal materials which can function at least in part independently of the electricity grid, so as to reduce energy supply costs and therefore overall production costs.

One purpose is also to reduce the risk of shutdown of the working plants due to blackout phenomena on the electricity grid, which in the most severe cases can last even several days.

Another purpose is to reduce the uptake of energy from the public electricity grid, reducing the consumption made on said grid.

Another purpose is to perfect a method for powering a heating and/or melting plant of metal material which allows to limit the supply of electrical energy by the electricity grid.

It is also a purpose to allow the functioning of a heating and/or melting plant of metal material during the entire period of time throughout the day and/or night.

A further benefit and advantage brought by the present invention is also that it allows to reduce $CO_2$ emissions, or other correlated emissions, if the production of energy by the public grid is not completely generated by renewable sources of energy.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, embodiments described here concern a plant for melting and/or heating metal material, comprising a furnace in which the metal material can be introduced, electrical energy feed means, and at least one electric power apparatus connected between the electrical feed means and the furnace, and suitable to power the furnace with desired voltage and current.

In accordance with some embodiments, the power apparatus comprises:

- at least one transformer connected to an electricity grid and configured to receive an alternating primary electric voltage and an alternating primary electric current and transform them into an alternating secondary electric voltage and an alternating secondary electric current;
- a plurality of rectifiers connected to the transformer and configured to transform the alternating secondary electric voltage and the alternating secondary electric current into a direct intermediate electric voltage and a direct intermediate electric current;
- a plurality of converters connected on one side to the rectifiers, and on the other side to the load, that is, to the furnace, and configured to convert the direct intermediate electric voltage and direct intermediate electric current into an alternating supply voltage and an alternating supply current, to be supplied to the furnace.

According to some embodiments, the power apparatus also comprises a control and command unit configured to control and command the functioning of the converters and regulate over time the supply voltage and current toward the load.

According to some embodiments, the melting and/or heating plant comprises at least one source of alternative energy, different and independent from the electricity grid, connected to the power apparatus and configured to supply energy to power the load in addition, or as an alternative, to the electrical energy supplied by the power grid.

Thanks to the source of alternative energy, it is possible to at least partly power the melting and/or heating plan independently of the electricity grid, and possibly allow at least a temporary disconnection of the melting and/or heating plant from the electricity grid, or in any case reduce the supply of energy from the electricity grid as a function of the daily time frame, possibly limiting it to the times when it is less expensive.

In addition, the presence of the source of alternative energy allows to be able to use the melting and/or heating plant even in the event of malfunctions or blackouts of the electricity grid.

According to some embodiments, the source of alternative energy can comprise a source of renewable energy, for example suitable to supply energy chosen from solar energy, wind energy, or hydroelectric energy.

According to possible variants, the source of alternative energy can comprise a source of energy of the non-renewable type, for example deriving from the combustion of fossils, such as oil, coal, or gas.

According to some embodiments, the source of alternative energy can comprise a source of alternating energy configured to supply alternating electric voltage and current.

According to possible solutions, the source of alternating energy can comprise a hydroelectric plant, or a dam, suitable to produce hydroelectric energy, or a wind power plant comprising at least one wind turbine, suitable to provide wind energy. The dam, the hydroelectric plant and the wind power plant can be provided with respective alternator devices, suitable to convert the respective renewable energy produced into alternating electric voltage and current to be supplied to the power apparatus.

According to some variants, the source of alternative energy can comprise a source of direct energy, configured to supply direct electric voltage and current. According to some embodiments, the source of direct energy can comprise, for example, a photovoltaic plant comprising a plurality of photovoltaic panels.

Thanks to the conformation of the power apparatus, it is possible to connect both sources of alternating energy and also sources of direct energy to it, by modifying on each occasion the input point of the alternative energy into the power apparatus, without needing to provide additional dedicated components and systems.

According to some embodiments, the sources of alternating energy can be connected directly to the transformer of the power apparatus. In this way, the rectifiers downstream rectify the alternating voltage and current, supplying a direct voltage and current that can be then fed to the converters in order to obtain the supply voltage and current.

According to some embodiments, the sources of direct energy can be connected to an intermediate circuit in direct current, located downstream of the rectifiers, since it is not necessary to provide any step of rectifying the direct energy, and it can be supplied directly to the converters in order to transform it into supply voltage and current.

According to some embodiments, between the sources of direct energy and the intermediate circuit tin direct current, here can be provided electrical components configured to guarantee the unidirectionality of the current produced. This prevents incorrect polarity of the electric current at entry from damaging the components of the power apparatus.

According to some embodiments, two or more alternative sources of energy can be provided, of the same type or possibly also of a different type.

For example, a first source of alternative energy can be provided comprising a source of alternating energy connected to the transformer of the power apparatus, and a second source of alternative energy comprising a source of direct energy connected to the intermediate circuit.

According to further embodiments, the power apparatus can comprise at least one connection interface for the connection with an electricity grid and at least one connection interface for the connection with one or more sources of alternating energy and/or with one or more sources of direct energy.

According to some embodiments, the melting and/or heating plant can also comprise a management unit configured to detect and monitor the status of the supply grid and of the at least one source of alternative energy, and determine whether to use one, the other, or both, to power the power apparatus and the load, as a function of the status detected and/or the amount of energy required on each occasion by the load.

It is therefore an advantage to be able to maintain the operation of the load at high power, in the event, for example, of less energy available from the at least one source of alternative energy, or in the event of a blackout on the public electricity grid.

Advantageously, the management unit can detect one or more parameters including the availability of energy supplied by the grids, the costs of the energy and the extent of the integration of the at least one source of alternative energy with the available energy, in order to cover the energy needs of the load.

In this way, it is possible to choose on each occasion the most suitable source of energy supply, that is, the energy supplied by the electricity grid, or the energy supplied by the at least one source of alternative energy, also based on the energy costs. Therefore, having to reduce production, or turn off processing plants, in cases of lack of energy, or of excessive energy cost, is avoided.

According to other embodiments, at least in the event sources of renewable energy are used, electrical energy accumulator device can be provided connected between the at least one source of alternative energy and the power apparatus, configured to allow the conservation of the energy auto-produced when there is no demand from the furnace, that is, from the load.

The energy accumulated can therefore be used at later times, for example when the source of alternative energy is not available, or cannot supply sufficient energy.

The present invention also concerns a method to power a heating and/or melting plant of metal materials which provides to power the furnace by means of at least one source of alternative energy, different and independent from the electricity grid.

BRIEF DESCRIPTION OF THE DRAWINGS

These and other aspects, characteristics and advantages of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the possible embodiments of the invention, of which one or more examples are shown in the attached drawings. Each example is supplied by way of illustration of the invention and shall not be understood as a limitation thereof. For example, one or more characteristics shown or described insomuch as they are part of one embodiment can be varied or adopted on, or in association with, other embodiments to produce other embodiments. It is understood that the present invention shall include all such possible modifications and variants.

Embodiments of the present invention concern a plant 10 for melting and/or heating metal materials, comprising an electric furnace 11 and a power apparatus 12 suitable to electrically power the electric furnace 11.

According to some embodiments, the power apparatus 12 can be configured to power loads of the three-phase type.

According to some embodiments, the melting and/or heating plant 10 comprises electrical energy feed means 13 configured to supply electrical energy to the power apparatus 12.

The electrical energy feed means 13 comprise at least one connection 14 to an electricity grid 15 that supplies mains alternating voltage Ur and current Ir.

According to some embodiments, the electricity grid 15 can be three-phase.

According to some embodiments, the mains voltage Ur and the mains current Ir can have a predefined mains frequency fr.

In accordance with possible solutions, the mains frequency fr is a value chosen between 50 Hz and 60 Hz, that is, on the basis of the frequency of the electricity grid of the country in which the furnace 11 is installed.

According to some embodiments, the electrical energy feed means 13 comprise at least one source of alternative energy 16, different and independent from the electricity grid 15.

According to some embodiments, the source of alternative energy 16 is separated from the electricity grid 15 and is connected directly to the power apparatus 12. By "directly" connected, we mean that the source of alternative energy 16 supplies energy to the power apparatus 12 without interacting with the electricity grid 15 and therefore without passing through a connection 14 with it.

According to some embodiments, the furnace 11 of the type in question can be an electric arc furnace, a submerged electric arc furnace, an induction furnace, a ladle furnace, or in general a melting or refining or induction heating furnace of the type suitable to be used in a steel plant for the production of steel, or plants for the production of glass.

In the following description, we will refer by way of example to an electric arc furnace 11, comprising a container 17, or shell, into which metal material M to be melted is introduced.

The furnace 11 is also provided with a plurality of electrodes 18, in the case shown three electrodes 18 configured to trigger an electric arc through the metal material M and melt it.

According to embodiments of the present invention, the electrodes 18 are installed on movement devices 19 configured to selectively move the electrodes 18 toward/away from the metal material M.

The movement devices 19 can be chosen in a group comprising at least one of either a mechanical actuator, an electric actuator, a pneumatic actuator, a hydraulic actuator, an articulated mechanism, a mechanical kinematic mechanism, similar and comparable members or a possible combination of the previous ones.

In accordance with a possible solution of the present invention, if the number of electrodes 18 is three, each of them is connected to a respective power supply step of the power apparatus 12.

According to some embodiments, the power apparatus 12 is able to receive energy supplied by the feed means 13, that is, by the electricity grid 15 and/or by the source of alternative energy 16 and transform it into supply voltage and current having determinate electrical parameters "Ua", "Ia", "fa" suitable to power the furnace 11.

According to some embodiments, the power apparatus 12 comprises at least one transformer 20 connected to the electricity grid 15 and configured to transform a primary alternating voltage and current into a secondary alternating voltage and current.

In accordance with possible solutions, the transformer 20 can comprise a transformer primary 21 magnetically coupled to at least one transformer secondary 22.

According to a possible solution of the invention, the transformer 20 can comprise a plurality of transformer secondaries 22 magnetically coupled to the transformer primary 21. This solution allows to reduce the impact of the disturbances on the grid side, that is, to reduce the harmonic content and the reactive power exchanged with the electricity grid 15.

The secondary electrical energy supplied by the transformer 20 has a secondary voltage Us, a secondary current Is, and a secondary frequency fs, predefined and set by the design characteristics of the transformer 20 itself.

In particular, the secondary frequency fs can be substantially equal to the mains frequency fr identified above, or in general to the primary frequency fp of the current circulating in the transformer primary 21.

The secondary voltage Us and the secondary current Is can instead be correlated, respectively, to the mains voltage Ur, and to the mains current Ir, or in general to the primary voltage Up, and to the primary current Ip of the transformer primary 21, by the transformation ratio of the transformer 20 itself.

The transformer 20, for example of the multi-tap type, can be provided with regulation devices, not shown, provided to selectively regulate the electrical transformation ratio of the transformer 20 in relation to the specific needs.

The power apparatus 12 according to the present invention also comprises a plurality of rectifiers 23 connected to the transformer 20 and configured to transform the alternating secondary voltage and current into continuous intermediate voltage and current.

Specifically, the rectifiers 23 allow to rectify the alternating secondary voltage Us and the alternating secondary current Is, into respective direct intermediate voltage Ui and direct intermediate current Ii.

The rectifiers 23 can be chosen in a group comprising a diode bridge and a thyristor bridge.

In accordance with a possible solution, the rectifiers 23 comprise devices, for example chosen from a group comprising Diodes, SCR (Silicon Controlled Rectifier), GTO (Gate Turn-Off thyristor), IGCT (Integrated Gate-Commutated Thyristor), MCT (Metal-Oxide Semiconductor Controlled Thyristor), BJT (Bipolar Junction Transistor), MOSFET (Metal-Oxide Semiconductor Field-Effect Transistor) and IGBT (Insulated-Gate Bipolar Transistor).

According to some embodiments, the power apparatus 12 comprises a plurality of converters 24 connected to the rectifiers 23 and configured to convert the direct voltage and current into an alternating voltage and current for powering the electrodes 18.

In accordance with a possible solution, the converters 24 comprise devices chosen, for example, in a group comprising SCR (Silicon Controlled Rectifier), GTO (Gate Turn-Off thyristor), IGCT (Integrated Gate-Commutated Thyristor), MCT (Metal-Oxide Semiconductor Controlled Thyristor), BJT (Bipolar Junction Transistor), MOSFET (Metal-Oxide Semiconductor Field-Effect Transistor), and IGBT (Insulated-Gate Bipolar Transistor).

In accordance with possible solutions of the present invention, the regulation devices 26 can comprise, by way of example only, a hysteresis modulator, or a PWM (Pulse-Width-Modulation) modulator.

These types of modulators can be used to command the semiconductor devices of the rectifiers 23 and the converters 24. These modulators, suitably controlled, generate values of voltage or current to be supplied to the furnace 11, in this specific case to the electrodes 18.

In accordance with possible solutions, the rectifiers 23 can be connected to the converters 24 by means of at least one intermediate circuit 27 which works in direct current.

The intermediate circuit 27 can be configured to store direct electrical energy and generate a separation between the rectifiers 23 and the converters 24 and, therefore, at least with the electricity grid 15, or possible sources of alternative energy 16 connected upstream of the intermediate circuit 27 with respect to the furnace 11.

In particular, the rapid power fluctuations deriving from the process are partly filtered by means of the intermediate circuit 27 reducing the impact thereof on the electricity grid 15 side.

The rectifiers 23, the converters 24, and the intermediate circuit 27 can define a direct current unit 28. In particular, the direct current unit 28 can comprise the direct components of the rectifiers 23 and of the converters 24.

Figure 2:
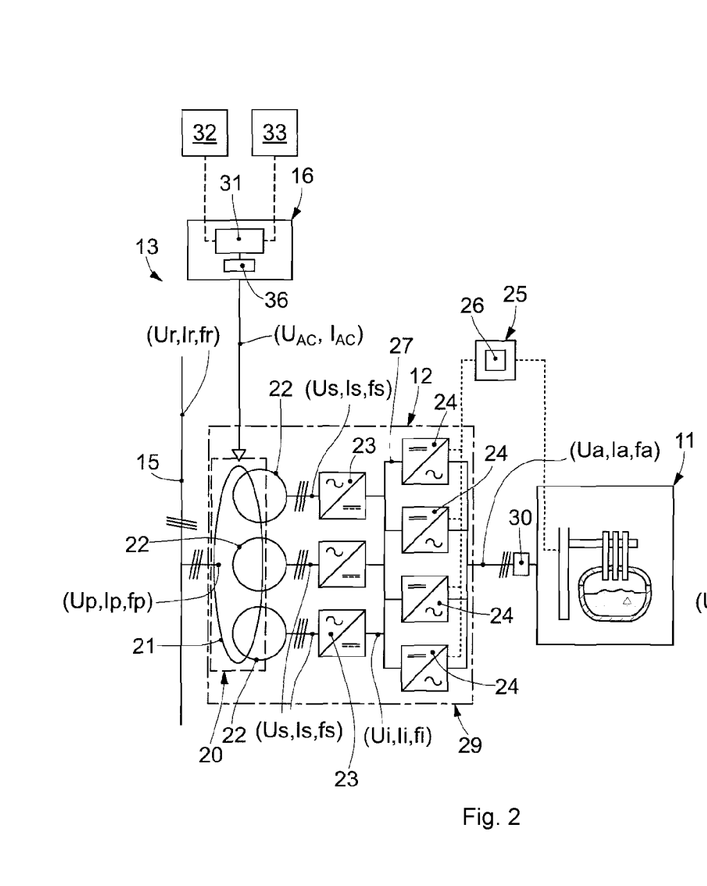
FIG. 2 is a schematic view of a heating and/or melting plant provided with an alternative source of alternating energy according to the embodiments described here.
Figure 3:
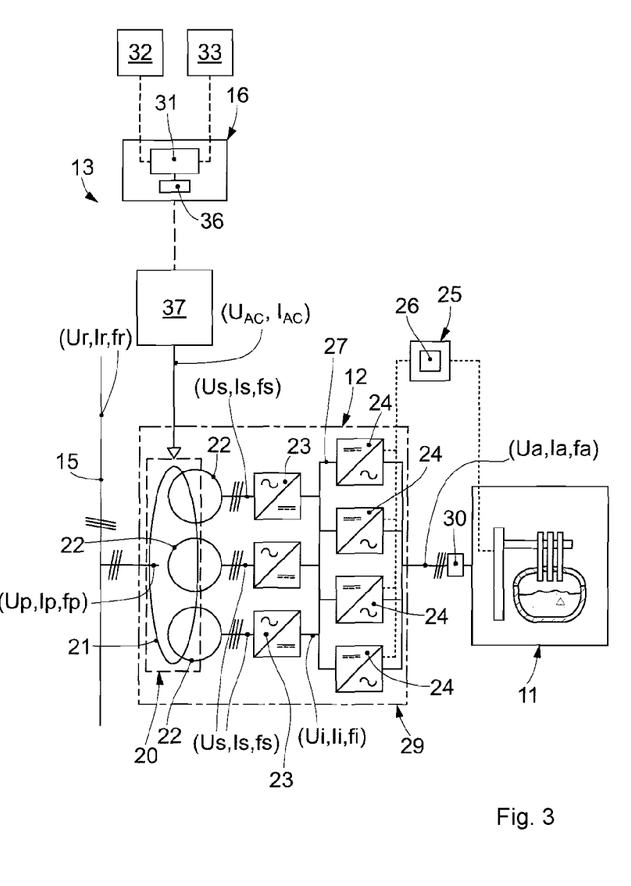
FIG. 3 is a schematic view of a heating and/or melting plant provided with an alternative source of alternating energy according to variant embodiments.

According to some embodiments, for example described with reference to FIGS. 2 and 3, the at least one source of alternative energy 16 comprises a source of electrical energy in alternating current 31 configured to provide alternating electric voltage UAC and current IAC.

According to some embodiments, the source of energy in alternating current 31 is connected to the transformer 20.

According to preferred embodiments, the source of electrical energy in alternating current 31 is connected to the transformer primary 21. In this case, the alternating electric voltage UAC and current IAC are transformed by the transformer 20, rectified by the rectifiers 23 and converted by the converters 24.

According to other embodiments, it is also possible to connect the source of electrical energy in alternating current 31 to, or to each, transformer secondary 22, even if in this case it is necessary to provide another transformer, or auxiliary circuits in order to obtain a secondary voltage Us and a secondary current Is with the desired characteristics.

According to some embodiments, the source of alternating electrical energy 31 can comprise a source of renewable energy.

According to possible solutions, the source of renewable energy can comprise a hydroelectric power station, or a dam 32, suitable to convert hydroelectric energy into electrical energy.

According to other embodiments, which can be combined with the previous ones, the source of renewable energy can comprise a wind power plant having at least one wind turbine 33 suitable to convert wind energy into electrical energy.

According to example embodiments, twenty or more wind turbines 33 can be provided, each suitable to supply an electric power of about 5 MW, so as to be able to substantially power the furnace 11 only by means of the energy supplied by the source of alternative energy 16, at least when it is in operation.

According to some embodiments, at least one alternator 36 can be provided configured to generate electrical energy in alternating current.

According to some embodiments, for example described with reference to FIG. 3, at least one electrical energy accumulator device 37 is provided, connected between the at least one source of alternative energy 16 and the power apparatus 12.

The accumulator device 37 is configured to accumulate electrical energy produced by a source of renewable energy 32, 33 when this is not used to power the furnace 11, so as to store it and make it available to be used at later times. By way of example, the accumulator devices 37 can comprise a bank of capacitors, or ultracapacitors.

In the case of a source of alternating electrical energy, the accumulator devices 37 can comprise respective rectifier and alternator devices disposed upstream and downstream of the bank of capacitors, configured to rectify and respectively convert the alternating current and voltage.

Figure 4:
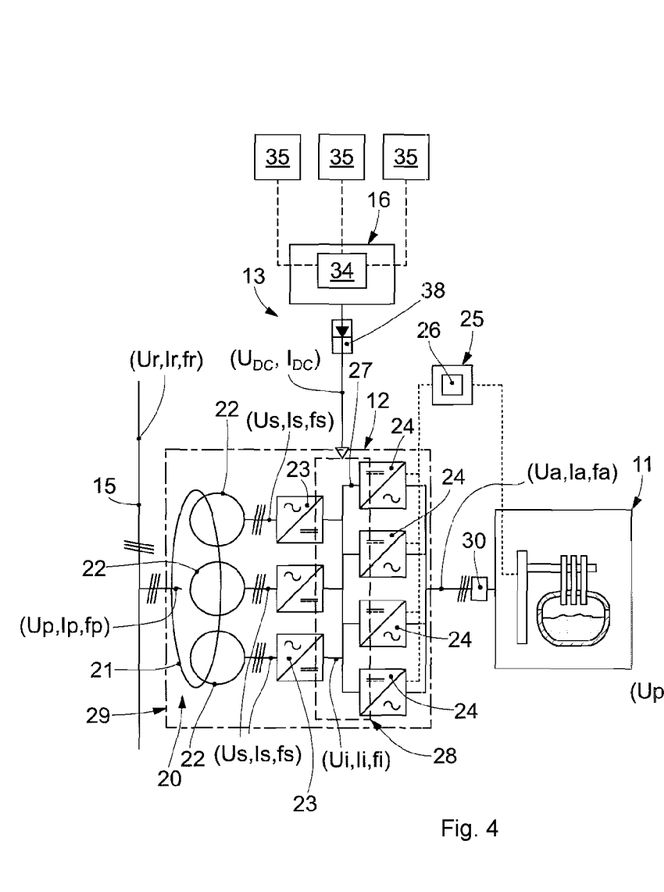
FIG. 4 is a schematic view of a heating and/or melting plant provided with an alternative source of alternating energy according to the embodiments described here.
Figure 5:
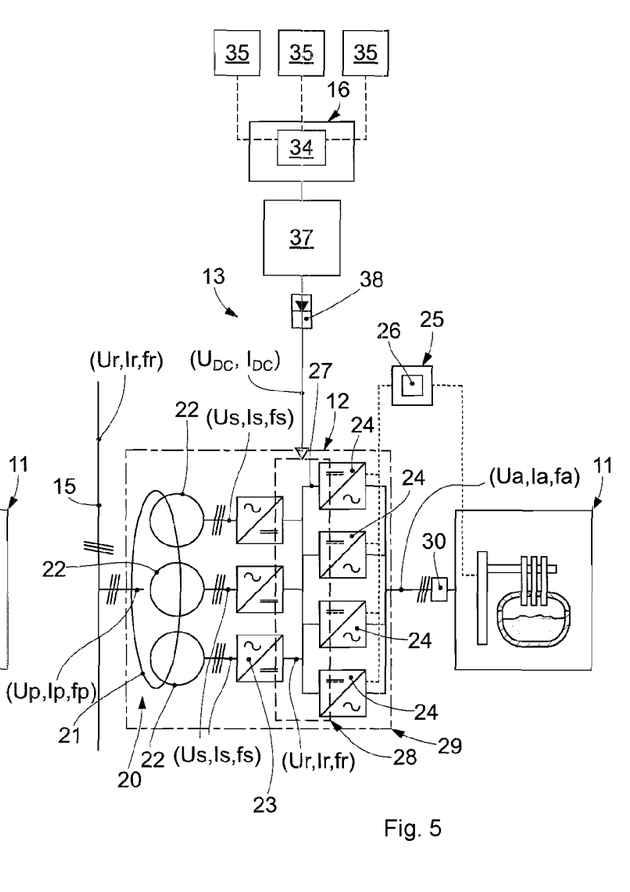
FIG. 5 is a schematic view of a heating and/or melting plant provided with an alternative source of direct energy according to variant embodiments.

According to other embodiments, described with reference to FIGS. 4, 5 and 7, and combinable with the previous ones, the at least one source of alternative energy 16 can comprise a source of direct electrical energy 34 configured to supply direct electric voltage UDC and direct electric current IDC.

According to some embodiments, the source of direct electrical energy 34 can be connected directly to the intermediate circuit 27 downstream of the rectifiers 23.

According to some embodiments, there can be provided a unidirectional electrical component 38 configured to guarantee the unidirectionality of the current produced. This prevents incorrect polarities of the electric current IDC at entry from damaging the components of the power apparatus 12.

The unidirectional electrical component 38 can be, for example, a diode or a diode circuit.

According to possible solutions, the source of direct electrical energy 34 is a source of renewable energy comprising a plurality of photovoltaic panels 35 suitable to convert solar energy into electrical energy.

According to some embodiments, a number of photovoltaic panels can be provided suitable to obtaining powers in the range of, but also over, 100 MW, so as to be able to adequately power the melting and/or heating plant 10.

In this case, the direct electric voltage UDC and direct electric current IDC only need to be converted by the converters 24 into alternating supply voltage Ua and alternating supply current Ia.

According to some embodiments, for example described with reference to FIG. 5, an electrical energy accumulator device 37 can be provided connected between the at least one source of alternative energy 16 and the power apparatus 12.

The one or more sources of alternative energy 16 can be provided directly in the proximity of the area where the load to be powered is located, in this specific case the arc furnace 11, or it/they can also be disposed a few hundred meters or a few kilometers away from such load.

Figure 7:
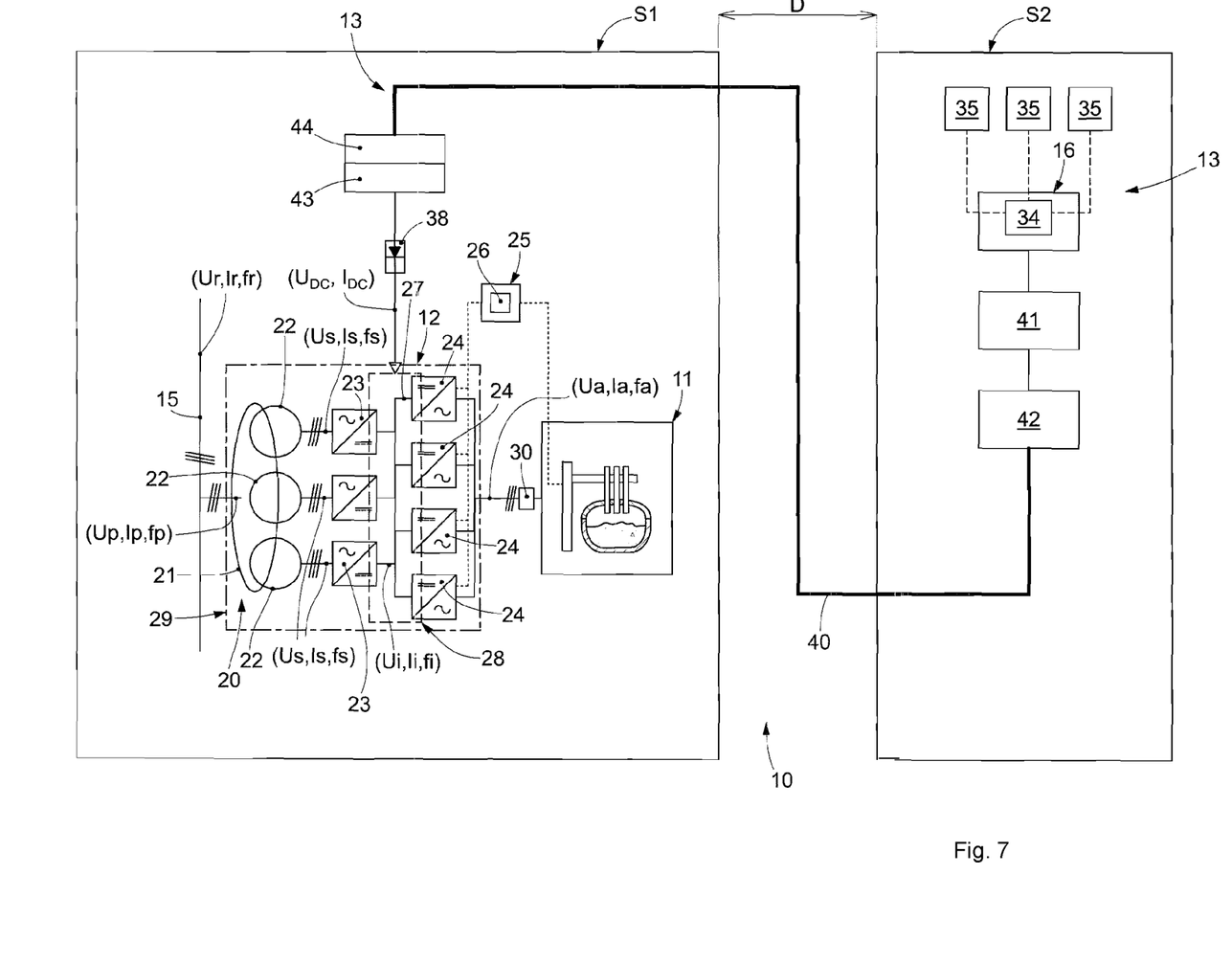
FIG. 7 is a schematic view of a plant according to a variant of FIG. 4.

FIG. 7 is used to describe an embodiment in which the electric arc furnace 11 is located in a first site S1, and at least one source of alternative energy 16 is disposed in a second site S2, for example located at a distance D comprised between 500 m and 2000 m from the first site S1.

According to this embodiment, it could be complicated to dispose cables of a size suitable to carry the current from the second site S2 to the first site S1. In fact, the photovoltaic panels 35 generally disposed in strings parallel to each other have a voltage of about 1500 V DC and therefore generate very high currents, since they have to supply sufficient energy to power an electric arc furnace 11. At a distance D of the order of 500-2000 m, it would therefore be necessary to provide cables with very large cross-sections and significant energy losses could occur along them.

According to the embodiment shown in FIG. 7, the electrical energy feed means 13 comprise a converter device 41 configured to convert the electrical energy in direct current supplied by the photovoltaic panels 35 into energy in alternating current AC, so as to transport the energy in the form of alternating current AC to the first site S1.

In this way, the energy can be transported with negligible losses even over long distances, without requiring excessive oversizing of the cables, and making it easier to make and install the connections of the melting and heating plant 10. In this case, the source of alternative energy 16 and the power apparatus 12 can be connected to each other by means of one or more cables 40 in alternating current at medium or high voltage.

In correspondence with the first site S1, the electrical energy feed means 13 comprise a rectifier circuit 42, for example a rectifier bridge, configured to convert the energy from alternating current into direct current.

Downstream of the converter device 41 there can also be provided a step-up transformer 43 configured to step up the output generation voltage of the converter device 41, normally at low-voltage, into a medium or high voltage value. By way of example, the step-up transformer 43 can be configured to supply an output electric voltage of the order of a few kV (usually 11, 22 or 33 kV).

In this case, a correlated step-down transformer 44 can be provided which is suitable to step down the voltage of the electrical energy fed along the cable 40 into a low or medium voltage value, coherent with the value of the voltage along the intermediate circuit 27. The step-down transformer 44 can preferably be disposed upstream of the rectifier bridge 42, if present.

According to other embodiments, not shown, it could also be provided that the energy in alternating current is fed directly to the transformer 20, possibly after it has been transformed, if necessary, by means of the step-down transformer 43.

According to further embodiments, the at least one source of alternative energy 16 comprises a source of non-renewable energy, configured to obtain electrical energy by means of combustion of fossil fuels, wherein the source of non-renewable energy is chosen in a group comprising gas turbines, or auxiliary power generators powered by coal or oil.

According to some embodiments, two or more sources of alternative energy 16 can be provided, of the same type or possibly also of a different type.

Figure 6:
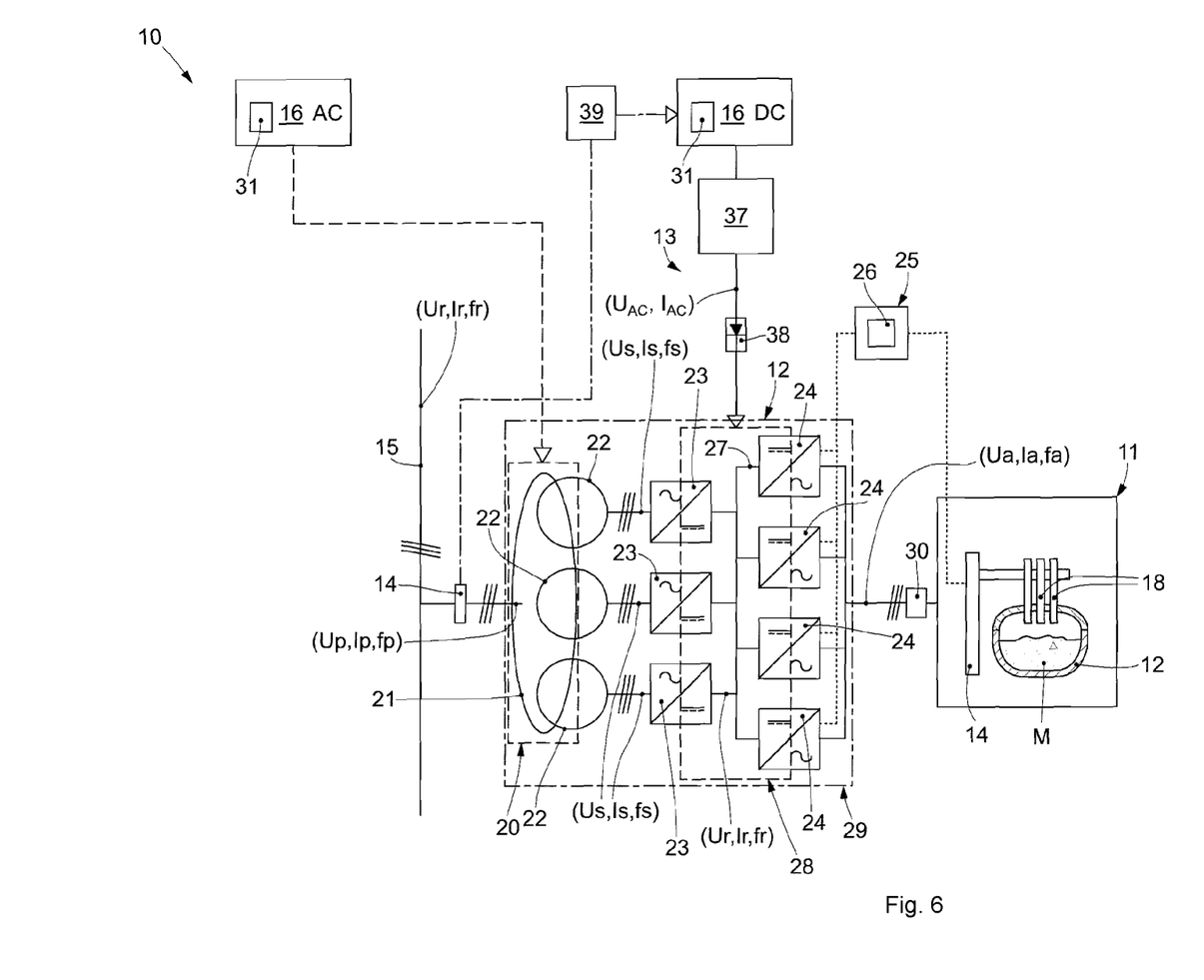
FIG. 6 is a schematic view of a heating and/or melting plant according to variant embodiments.

For example, according to embodiments shown in FIG. 6, a first source of alternative energy 16AC can be provided, comprising a source of alternating electrical energy 31, connected to the transformer 20 of the power apparatus 12, and a second source of alternative energy 16DC, comprising a source of direct electrical energy 34, connected to the intermediate circuit 27.

Thanks to the construction of the power apparatus, it is possible to connect a plurality of sources of alternative energy 16 to it, provided with respective sources of alternating energy 31, or of direct energy 34 without needing to provide other components.

It is clear, however, that a source of direct electrical energy 34 could be connected to the transformer 20 providing a suitable converter between them in order to convert direct voltage and current UDC, IDC into alternating voltage and current UAC, IAC.

Vice versa, it is also possible to provide to connect the source of alternating electrical energy 31 to the intermediate circuit 27, or to the unit 28, providing a rectifying device suitable to convert the alternating voltage and current UAC, IAC into direct voltage and current UDC, IDC.

Figure 1:
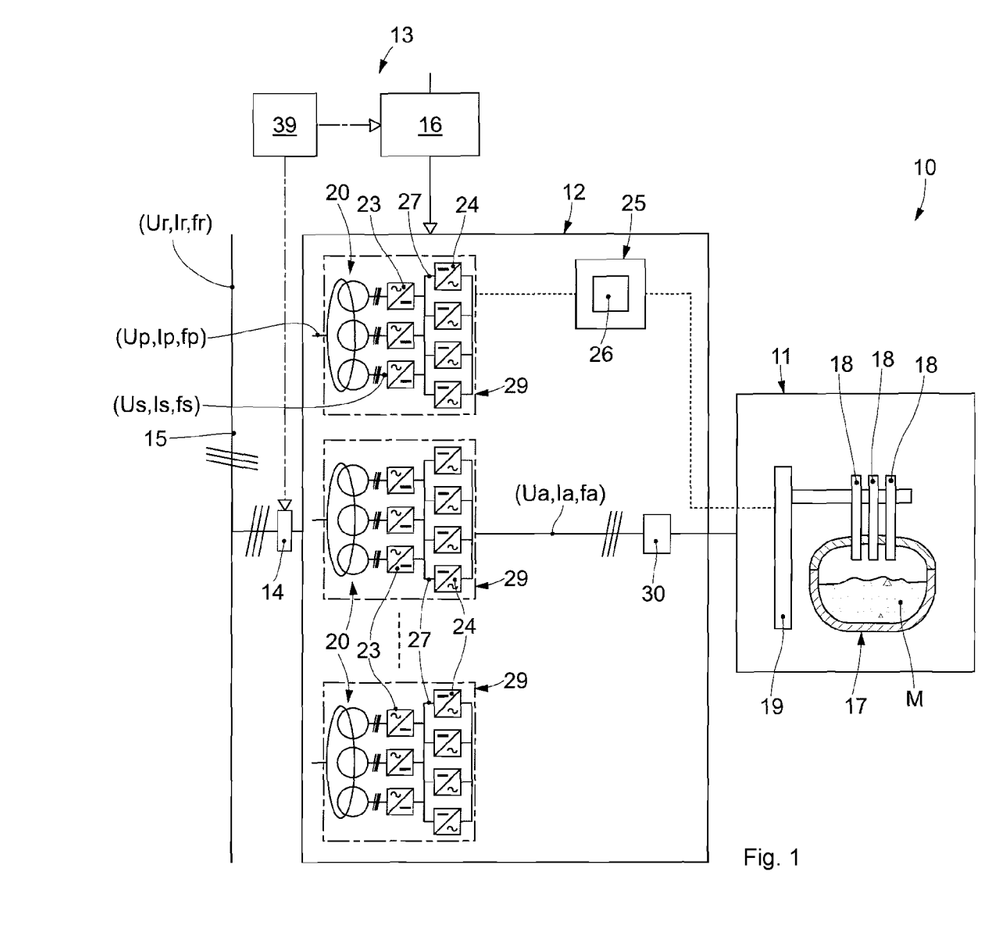
FIG. 1 is a schematic view of a heating and/or melting plant of metal materials according to the embodiments described here.

According to some embodiments, for example described with reference to FIGS. 1 and 6, the melting and/or heating plant 10 comprises a management unit 39 configured to monitor one or more parameters including the functioning status, the quality, the availability of energy, and/or the cost of the electrical energy supplied by the electricity grid 15 and, respectively, by the one or more source of alternative energy 16, 16AC, 16DC, and the amount of energy required by the furnace 11, and select one, the other, or both in order to supply electrical energy to the power apparatus 12.

By availability we mean the amount of energy produced and/or accumulated by a source of alternative energy 16.

The energy costs can be calculated on the basis of the tariffs of the electricity grid 15, on the basis of the time slots of use if associated with different costs, on the basis of the costs for managing the sources of alternative energy 16, on the basis of the cost of the raw materials and suchlike. For example, they can be calculated on the basis of the cost of the oil or coal in the case of non-renewable sources.

According to some embodiments, the melting and/or heating system 10 can comprise counting devices associated with the at least one source of alternative energy 16, and configured to count and/or monitor the amount of energy produced by the one or more renewable sources 32, 33, 35.

According to some embodiments, the melting and/or heating system 10 can comprise devices suitable to detect and/or estimate the energy power absorbed over time by the furnace 11, and provide this information to the management unit 39.

As a function of the status detected, that is, the amount of energy produced on each occasion by the source of alternative energy 16, and possibly the amount of energy accumulated in the accumulation device(s) 37, the management unit 39 can determine whether to use as feed means 13 only the electricity grid 15, only the at least one source of alternative energy 16, or both.

In particular, the management unit 39 can be configured to select on each occasion all, and only the feed means 13 which are necessary on the one hand to guarantee the correct functioning of the melting and/or heating plant 10 and, on the other, to optimize overall energy consumptions, in particular reducing the supply of energy by the electricity grid 15.

According to further embodiments, the power apparatus 12 comprises a control and command unit 25 configured to control and command the functioning of the converters 24 and to regulate over time the alternating supply voltage and current supplied to the electrodes 18.

According to some embodiments, the control and command unit 25 can control the converters 24 so as to selectively set the parameters of the alternating supply voltage Ua and alternating supply current la.

According to some embodiments, the control and command unit 25 can be provided with regulation devices 26 configured to regulate the supply electrical frequency "fa" of the alternating supply voltage "Ua" and alternating supply current "la", and obtain a simultaneous variation of the reactance value of the supply circuit of the furnace 11.

Specifically, the supply voltage "Ua" and current "la" are selectively regulated in relation to the melting powers involved.

According to possible solutions, the transformer 20, the rectifiers 23 connected to the transformer 20, and the converters 24 together define a power module 29.

According to some embodiments, the power apparatus 12 can be provided with a plurality of power modules 29, connected in parallel with each other to the electricity grid 15 and to the electric furnace 11.

According to some embodiments, the power modules 29 can be connected in parallel with each other to the at least one source of alternative energy 16 and to the electric furnace 11.

The combination of several power modules 29 allows to obtain a scalable power apparatus 12 with sizes in relation to the specific size of the furnace 11 that has to be powered.

In accordance with a possible solution, the control and command unit 25 is connected to all the power modules 29 in order to control at least the respective converters 24, so that each module provides the same values of supply electric voltage, current, and frequency to the electrodes 18. In this way, it is possible to avoid malfunctions of the entire system.

In accordance with a possible solution, the power apparatus 12 can comprise an inductor 30 configured to obtain the desired overall reactance of the apparatus.

The inductor 30 can be connected downstream of the converters 24 and is sized so as to reach the total equivalent reactance desired. In this way, it is possible to obtain an overall reactance which is given by the contribution of the inductor 30 and by the reactance introduced by the conductors that connect the power apparatus 12 to the electric furnace 11, that is, in this specific case to the electrodes 18.

In general, inductance is a (design) parameter that cannot be modified once the component is built.

By changing the frequency (with respect to e.g. the 50 Hz of the mains) it is possible, with the same inductance, to change the reactance value that the component assumes in the circuit, and therefore reach the total equivalent reactance value desired.

According to possible solutions, in the case of an electric arc furnace 11, it can be provided that the control and command unit 25 is in turn also connected to the movement device 19, in order to allow a regulation of the position of the electrodes 18 in relation to the different steps of the melting process.

In particular, the electrodes 18 are moved by the movement device 19 in order to follow the position of the material and therefore modify the length of the arc.

In this way, the control and command unit 25 can manage and command, in relation to the specific steps of the process, at least the following parameters: supply voltage Ua, supply current la, supply electrical frequency fa, and the position of the electrodes 18, if present.

The high possibility of controlling the different parameters allows to optimize the transfer of energy to the process, and at the same time a reduction of the effects on the electricity grid 15 and/or on the sources of alternative energy 16 deriving from the rapid variations in power on the furnace side.

Embodiments described here also concern a method to power a furnace 11 of a melting and/or heating plant 10 of metal material M.

According to some embodiments, the method provides to supply electrical energy by means of feed means 13 to a power apparatus 12 and convert the electrical energy by means of the power apparatus 12 in order to obtain an alternating supply voltage Ua and an alternating supply current Ia to be supplied to the furnace 11.

According to some embodiments, the method comprises:
- the supply, by means of an electricity grid 15, of a primary electric voltage Up and primary electric current Ip to a transformer 20;
- the transformation, with the transformer 20, of the primary electric voltage Up and primary electric current Ip into a secondary electric voltage Us and a secondary electric current Is;
- the rectifying of the secondary electric voltage Us and secondary electric current Is with a plurality of rectifiers 23 to obtain a direct electric voltage Ui and a direct electric current Ii;
- the conversion, with a plurality of converters 24, of the direct electric voltage Ui and direct electric current Ii into alternating supply voltage Ua and alternating supply current Ia, which can be selectively set by means of a control and command unit 25 connected to the converters 24;
- the feeding of the supply voltage Ua and supply current Ia to the furnace 11.

According to some embodiments, the method provides to supply electrical energy to the furnace 11 in addition, or as an alternative, to the electrical energy supplied by the electricity grid 15, by means of at least one source of alternative energy 16, different and independent from the electricity grid 15, connected to the power apparatus 12.

According to some embodiments, the method provides to detect one or more parameters including the availability of energy supplied by the grids, energy costs and extent of the integration of the energy available from alternative sources necessary to cover the energy needs of the furnace 11, and use one or more of either these parameters to define whether to power the power apparatus 12 with one, the other, or both, of the electricity grid 15 and the at least one source of alternative energy 16.

According to some embodiments, the power supply method can provide to use a source of alternating electrical energy 31 and to supply the alternating voltage and current UAC, IAC directly to the transformer primary 21.

According to some embodiments, the power supply method can provide to use a source of direct electrical energy 34 and to supply the direct voltage and current UDC, IDC directly to the intermediate circuit 27 in direct current downstream of the rectifiers 23.

It is clear that modifications and/or additions of parts or steps may be made to the melting and/or heating plant 10 and to the power supply method as described heretofore, without departing from the field and scope of the present invention.

It is also clear that, although the present invention has been described with reference to some specific examples, a person of skill in the art shall certainly be able to achieve many other equivalent forms of melting and/or heating plant 10 and the power supply method, having the characteristics as set forth in the claims and hence all coming within the field of protection defined thereby.

The invention claimed is:

1. A plant for melting and/or heating metal material comprising: a furnace, electrical energy feed means and a power apparatus connected between said feed means and said furnace, wherein said power apparatus further comprises:
   - at least one transformer connected to an electricity grid, and configured to receive an alternating primary electric voltage and an alternating primary electric current and transform them into an alternating secondary electric voltage and an alternating secondary electric current;
   - a plurality of rectifiers connected to the transformer and configured to transform the alternating secondary electric voltage and the alternating secondary electric current into a direct intermediate electric voltage and a direct intermediate electric current;
   - a plurality of converters connected on one side to the rectifiers and on the other side to the furnace, configured to convert the direct intermediate electric voltage and direct intermediate electric current into an alternating supply voltage and an alternating supply current, to be supplied to the furnace, which can be selectively set by means of a control and command unit connected to said converters,
   wherein said feed means comprise at least one source of alternative energy, different and independent from said electricity grid, connected to said power apparatus and configured to supply energy to power said furnace in addition, or as an alternative, to the electrical energy supplied by said electricity grid.

2. The plant as in claim 1, wherein said at least one source of alternative energy comprises a source of electrical energy in alternating current configured to supply alternating electric voltage and current, wherein said source of energy in alternating current is connected to said transformer.

3. The plant as in claim 2, wherein said transformer comprises a transformer primary and a transformer secondary magnetically coupled to said transformer primary and said source of electrical energy in alternating current is connected to said transformer primary.

4. The plant as in claim 2, wherein said source of alternating electrical energy comprises a source of renewable energy chosen from a hydroelectric plant, or a dam, suitable to convert hydroelectric energy into electrical energy, or a wind power plant comprising at least one wind turbine suitable to convert wind energy into electrical energy and at least one alternator configured to generate electrical energy in alternating current.

5. The plant as in claim 1, wherein said at least one source of alternative energy comprises a source of direct electrical energy configured to supply direct electric voltage and direct electric current, wherein said source of direct electrical energy is connected to an intermediate circuit of said power apparatus downstream of said rectifiers.

6. The plant as in claim 5, wherein said source of direct electrical energy is a source of renewable energy comprising a plurality of photovoltaic panels suitable to convert solar energy into electrical energy.

7. The plant as in claim 5, wherein said furnace is located in a first site and said source of alternative energy is disposed in a second site located at a distance comprised between 500 m and 2000 m from the first site and said electrical energy feed means comprise one or more cables 40 in medium or high voltage alternating current which connect together said source of alternative energy and said power apparatus.

8. The plant as in claim 7, wherein said electrical energy feed means comprise a converter device for converting the electrical energy from direct current into alternating current in correspondence with said second site and a rectifier circuit configured to convert the energy from alternating current into direct current in said first site.

9. The plant as in claim 4, comprising at least one electrical energy accumulator device connected between said at least one source of alternative energy and said power apparatus, and configured to allow the accumulation of energy produced by the source of renewable energy when it is not used to power said furnace.

10. The plant as in claim 1, wherein said at least one source of alternative energy comprises a source of non-renewable energy, configured to obtain electrical energy by means of combustion of fossil fuels, in which the source of non-renewable energy is chosen from a group comprising gas turbines, or auxiliary generators of current.

11. The plant as in claim 1, comprising a management unit configured to monitor one or more parameters including the functioning status, quality, amount and/or cost of the electrical energy available from said electricity grid and from said at least one source of alternative energy and the amount of energy required by said furnace and select one, the other, or both in order to supply electrical energy to said power apparatus and therefore to said furnace at least as a function of the respective functioning status and of the overall energy costs.

12. The plant as in claim 1, wherein said transformer, said rectifiers and said converter define a power module and said power apparatus comprises a plurality of power modules connected, in parallel with each other, between said electricity grid and said furnace, and between said source of alternative energy and said furnace.

13. A method to feed electrical energy to a furnace of a plant for melting and/or heating metal materials, which provides to supply electrical energy by means of feed means to a power apparatus and convert said electrical energy by means of said power apparatus in order to obtain an alternating supply voltage and an alternating supply current to be supplied to said furnace, wherein said method comprises:
  supplying by means of an electricity grid, a primary electric voltage and primary electric current to a transformer;
  transforming with said transformer, said primary electric voltage and primary electric current into a secondary electric voltage and a secondary electric current;
  rectifying said secondary electric voltage and secondary electric current with a plurality of rectifiers to obtain a direct electric voltage and a direct electric current;
  converting with a plurality of converters, said direct electric voltage and direct electric current into said alternating supply voltage and alternating supply current which can be selectively set by means of a control and command unit connected to said converters;
  the feeding of said supply voltage and supply current to said furnace, and
  supplying electrical energy to the furnace in addition, or as an alternative, to the electrical energy supplied by the electricity grid, by means of at least one source of alternative energy, different and independent from said electricity grid and connected to said power apparatus.

14. The method as in claim 13, detecting and/or monitoring one or more parameters including functioning status, energy availability, and the cost of the energy supplied by said electricity grid and said source of alternative energy, and the amount of electrical energy required by said furnace and determine whether to use one, the other, or both, of said electricity grid and said source of alternative energy to power said power apparatus and therefore said furnace, at least as a function of the status detected and/or the amount of energy required by said furnace.

15. The method as in claim 14, wherein said source of alternative energy comprises a source of renewable energy and said method provides to accumulate the energy produced by said source of renewable energy in at least one accumulation device in order to be able to use it in subsequent moments.

* * * * *